United States Patent
Kong

(10) Patent No.: US 8,628,392 B1
(45) Date of Patent: Jan. 14, 2014

(54) GAME OF ACTUAL PLANNING, TASK/TIME MANAGEMENT, AND INFORMATION SHARING

(76) Inventor: Xiaohui Kong, Houston, TX (US)

( * ) Notice: Subject to any disclaimer, the term of this patent is extended or adjusted under 35 U.S.C. 154(b) by 34 days.

(21) Appl. No.: 12/784,177

(22) Filed: May 20, 2010

Related U.S. Application Data

(60) Provisional application No. 61/180,466, filed on May 22, 2009.

(51) Int. Cl.
*G06F 17/00* (2006.01)

(52) U.S. Cl.
USPC .................................................. 463/9; 463/43

(58) Field of Classification Search
USPC ........................................................ 463/9, 43
See application file for complete search history.

(56) References Cited

U.S. PATENT DOCUMENTS

| 7,534,157 | B2 | 5/2009 | Ganz | |
|---|---|---|---|---|
| 2008/0221892 | A1* | 9/2008 | Nathan et al. | 704/257 |
| 2008/0270240 | A1* | 10/2008 | Chu | 705/14 |

OTHER PUBLICATIONS adoptme.com, Jul. 23, 2008.*

* cited by examiner

Primary Examiner — Michael Cuff
(74) Attorney, Agent, or Firm — The Webb Law Firm

(57) ABSTRACT

The invention is a method of game play to facilitate managing tasks by providing a virtual pet, providing a database storing tasks, determining a current state of said virtual pet, displaying a virtual pet, said displayed pet based on the current pet state, linking a task related action to a pet related activity associated with status of said virtual pet, and maintaining said virtual pet by performing task related actions to activate a pet related activity to change said status of said virtual pet. The invention provides a system to allow players to make, revise, review, share, and keep track of plans in an enjoyable way. The invention also provides a method to associate friends who share the same life contents. Players of the game can find friends through the system who have the most similar actual tasks.

25 Claims, 14 Drawing Sheets

GAME OF ACTUAL PLANNING, TASK/TIME MANAGEMENT, AND INFORMATION SHARING

CROSS REFERENCE TO RELATED APPLICATIONS

This application is based on U.S. Provisional Patent Application No. 61/180,466, filed May 22, 2009, on which priority of this patent application is based and which is hereby incorporated by reference in its entirety.

BACKGROUND OF THE INVENTION

1. Field of the Invention

The present invention generally relates to simulation software, for example, software facilitating users to complete actual accomplishments and develop actual skills and knowledge.

2. Description of Related Art

Video games have evolved into a very influential and important industry over the years. According to the Entertainment Software Association (ESA) in 2008, 65% of American households played computer and video games. Among the 218 million garners in the United States, about 5.2 million are extreme garners who spend an average of 45 hours a week playing video games as reported by the NPD group in 2008. For the popular massively multiplayer online game (MMOG) title "World of Warcraft" with more than 10 million players, statistics have shown that the average amount of time each player spends on playing the game is 22.7 hours per week. Video game addiction is becoming a serious problem for many children, youths, and adults. Video game addiction, or more broadly, video game overuse, is defined as excessive or compulsive use of computer and video games that interferes with daily life. Instances have been reported in which users play compulsively, isolating themselves from other forms of social contact and focusing almost entirely on in-game achievements rather than broader life events.

To confront the challenges of misuse brought by video games, a category of video games known as "serious games" teach game players actual knowledge, help game players to develop actual skills, and allow game players to accomplish actual tasks during game play. For example, there are games to teach languages, typing, and children of different ages to develop skills in math, problem-solving, and music.

Most serious games, however, focus on teaching domain-specific knowledge or skills, i.e., how to respond in an emergency situation such as a flood or how to do elementary school arithmetic. After such knowledge or skills is assimilated either through playing the game or from other sources, playing the game would no longer result in actual benefit.

SUMMARY OF THE INVENTION

The present invention is a method of game play to facilitate managing tasks by providing a virtual pet, providing a database storing tasks, determining a current state of said virtual pet, displaying a virtual pet, said displayed pet based on the current pet state, linking a task related action to a pet related activity associated with status of said virtual pet, and maintaining said virtual pet by performing task related actions to activate a pet related activity to change said status of said virtual pet.

The virtual pet status can decline over a set period of time. The pet related activity to maintain the virtual pet includes caring activities, which virtually sustain and keep the virtual pet alive. These activities include feeding, watering, cleaning, and playing with the pet, or rewards related with a virtual pet. The task related actions include actions for allowing a player to make new tasks, revise tasks, review tasks, self-report progress on tasks, modify tasks, view tasks, share task information, and share task with friends. The caring activities can include activities simulating caring for a regular pet. Maintaining a virtual pet can include changing a status of the virtual pet. In one embodiment of the present invention, a virtual pet can be displayed in a virtual world in a browser application or mobile application. The virtual pet can be further integrated into a computer or mobile-device application using application interfaces to facilitate communication with the virtual pet. A task can be something that is planned to be done by a user, and is described by the user, said description stored in the database and comprises a status, location, date, emotion, details, sharing, and URL. Semantic verification of a task can include inputting a task action, extracting saved task action data, determining if the entered task begins with a verb by checking the first word in the data and comparing the word to a verb list using a dictionary database. The tasks are stored in the database.

A further method for creating a blog entry from a task includes retrieving a task, checking a the task, changing the status if the task is changed, by matching the task status, if the task status indicates the task is complete, task action is changed from present tense to past tense, if the task status indicates the task remains in progress, task action is changed to present, if the task status is new, the task action is changed to future tense, and modifying to indicate who did the task by adding user name, or subject, representing the player to the task. Similarity scores between two tasks entries is calculated by selecting two task entries, two task actions of the selected entries are input iterating through each pair of words between the task actions of the selected entries and computing a similarity score between a pair of words using a standard semantic relatedness measurement, and determining if all iterations are finished, the largest three similarity scores are found and they are used to calculate a sum.

The present invention further includes a method of recommending friends based on similarity scores while playing with virtual pets in a social interactive game. The method includes providing a plurality of virtual pets displayed in an interactive virtual world for a plurality of users, wherein for virtual pet a user provides a task stored in a task database, said task having a description comprises a word, selecting a pair of users in a database and retrieving a first task and a second task where the first and second task are for different users; computing a similarity score between said first task and second task by comparing a word description of the first and second task using a standard semantic relatedness measurement, repeating said computing step for each task of said pair of users, storing the similarity score for the pair of users, searching for players having the largest similarity score, and retrieving the selected players and displaying account names of the selected players in the player's profile user interface.

The present invention further includes a virtual pet association system. The system having a server system providing a virtual pet game, comprising a processor, an input device, and software, said software including programming instructions executable by said processor, a user interface is utilized to input task information to an application operating on an computer or a mobile device showing on a display, and a virtual world, where said input task information is operative to change status of a virtual pet virtually habitating in said virtual world, where status is an indicator of separate state items comprising hunger, thirst, cleanliness, karma, virtual money of the virtual pet and transformed into status using indicia of the relative states of the pet. The state is a task having a description and activities, where the task is input using a task user interface output in the display. The virtual pet game includes a link between a discrete task management activity and a state item, and user interaction invokes a discrete task management activity that changes the state item, when state status changes, it can be expressed in the virtual pet animation, showing visually the changes to a pet, as determined by an animation library comprising animation parameters to animate pet behavior, cosmetic appearance, or pet facial expression, an animation parameter associated to a pet status. The description can include one or more of status, location, date, emotion, details, sharing, and URL. The virtual pet game includes a diet list, the diet list being configurable to include one or more tasks. The virtual pet is fed by completing a task in the diet list to modify a state item, for example, a review of the task virtually cleans the virtual pet. A progress report virtually feeds the virtual pet, sharing tasks increases socialization, and viewing a pet diet list virtually quenches thirst of the virtual pet.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DESCRIPTION OF THE PREFERRED EMBODIMENTS

Figure 1:
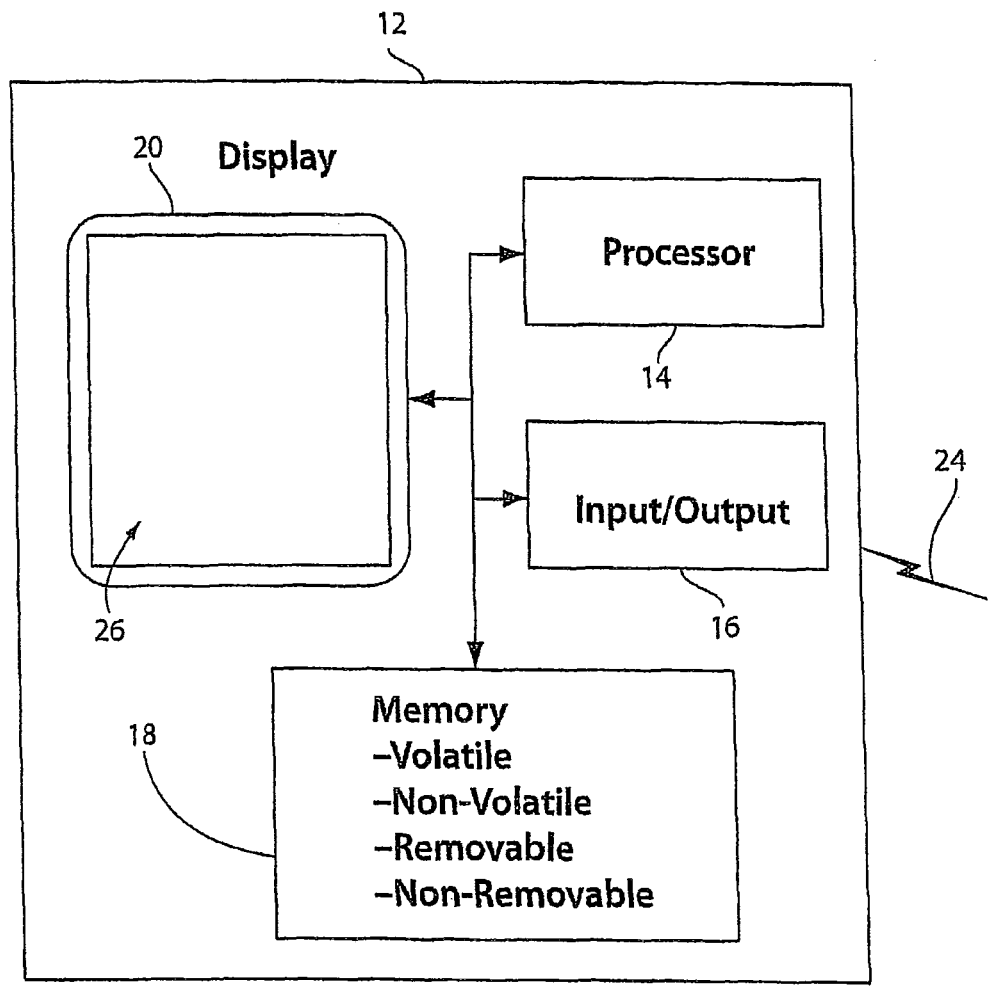
FIG. 1 is a diagram of an exemplary computing device for implementing an association system.

Embodiments of the present invention will now be explained with reference to the drawings. It will be apparent to those skilled in the art from this specification that the following descriptions of the embodiments of the present invention are provided for illustrative purposes only and not intended in any way as limiting. Other embodiments of the present invention will readily suggest themselves to such skilled persons having the benefit of this specification. Reference will now be made in detail to implementations of the present invention.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this invention.

In accordance with the present invention, the components, process steps, and/or data structures may be implemented using various types of operating systems, computing platforms, computer programs, and/or general purpose machines. In addition, those of ordinary skill in the art will recognize that devices of a less general purpose or nature, such as hardwired devices, field programmable gate arrays (FPGAs), application-specific integrated circuits (ASICs), or the like, may also be used without departing from the scope and spirit of the inventive concepts disclosed herein.

The terms "user" and "player" will be used interchangeably in this invention. A "user" of the game system is a "player" of the game system and vice versa. The terms "task" and "activity" will be used interchangeably in this invention. A task or activity is a unit of work that can be performed. The terms task or activity used herein have no indication of a user's emotional preference to the work.

The present invention is a serious game system that integrates actual elements of player's actual tasks and activities into a video game. The present invention helps players to make, revise, share, and/or carry out plans of actual activities, manage tasks, and/or connect with friends on actual activities. The game system includes a user interface, such as a graphical user interface, to obtain actual task data from players of the game. Task data generally describes actual plans, tasks, and/ or activities of a player. For example, an actual task element may be that a player writes homework or a player plays tennis.

The system further includes a database for storing the actual task data for players of the game system. A mapping process associates a player's actual task related actions with game content related actions. A graphics display outputs game contents to the players. It is a unique and important feature of the game system that allows players to associate their actual tasks and activities with the game contents.

In one exemplary example of operation, a player might access a graphical user interface to input the user's actual plan for afterschool hours as "write math homework," "play tennis," and "practice piano." In the present invention, completing, maintaining, or reporting progress on that the activities can effect the player's in-game achievements.

Organization of actual events, tasks, and schedules by making, revising, and carrying out plans is an essential skill that potentially affects every aspect of one's life. Plans, schedules, and to-do lists carried either inside our heads or on an external medium, such as paper, PDA, or computer effect our decisions on how to spend our time and energy. However, making, revising, and carrying out plans is not a trivial process and can be hard, boring, and dull for most people. There are two major obstacles both cognitive and psychological that prevent most people from being able to make plans, revise them constantly, and carry them out. First, there is a limited amount of information one can hold in one's head at the same time. As revealed by numerous cognitive psychology studies, human memory, which holds the "current" information, is severely limited in capacity. Plans or "what to do next" need to be kept active in memory in order to be effectively carried out. Plans can be easily wiped out by other information which requires immediate attention or reaction. People can be easily distracted from their plans when something else interesting, though less important, comes up. Young people, in particular, are increasingly adapted to receive immediate gratification as offered in video games. In video games, you make an action by pushing a button or clicking a mouse and then you receive immediate feedback from the game. But the process of making and revising plans does not provide immediate feedback.

Thus, the present invention allows individuals to associate their actual plans, tasks, and achievements with their game contents and in-game achievements using a computer or video game device, such as a cell phone, a PDA, a handheld video game device, or general-purpose hardware. A player benefits from playing the game because, besides its entertainment purpose, the game facilitates organizing plans, tasks, and activities. Specifically, the game system turns making, revising, tracking progress, and sharing information of actual plans into an enjoyable process, thus, it helps the player enjoy his/her actual tasks and achievements in an enjoyable environment.

With reference to FIG. 1, a diagram of an exemplary computing device 12 for implementing an association system is shown. In a basic configuration, the computing device 12 comprises a processing portion 14, a memory 18, and a display portion 20. Depending upon the exact configuration and type of the computing device 12, memory 18 can be volatile (such as RAM), non-volatile (such as ROM, flash memory, etc.), or some combination thereof. Computing device 12 also can include additional features/functionality. For example, computing device 12 also can include additional storage (removable and/or non-removable) including, but not limited to, magnetic, optical disks or tapes. Such additional storage is illustrated in FIG. 1 as part of memory 18. Computer storage media includes volatile and non-volatile, removable and non-removable, media implemented in any method or technology for storage of information, such as computer-readable instructions, data structures, program modules, or other data. Memory 18 and any portion thereof, such as removable storage and non-removable storage, can be implemented utilizing computer storage media. Computer storage media includes, but is not limited to, RAM, ROM, EEPROM, flash memory, or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by computing device 12. Any such computer storage media can be part of computing device 12.

Computing device 12 also can comprise an input/output portion 16 containing communications connection(s) that allows the computing device 12 to communicate with other devices and/or networks via an interface 24. Interface 24 can comprise a wireless interface, a hard-wired interface, or a combination thereof. Input/output portion 16 also can comprise and/or utilize communication media. Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limiting, communication media includes wired media, such as a wired network or direct-wired connection, and wireless media, such as acoustic, RF, infrared, and other wireless media. The computing device 12 can be connected to a server over the Internet for delivery of web/Internet applications. Configurations for delivering web applications are available, arranging computer devices and servers to perform processes described herein. The term computer readable media, as used herein, includes both storage media and communication media. Input/output portion 16 also can comprise and/or utilize an input device(s), such as a keyboard, a mouse, a pen, a voice input device, and a touch input device, or the like, for example. An output device(s) such as a display, speakers, printer, or the like, for example, also can be included.

Display portion 20 comprises a portion 26 for rendering an association system of the present invention or a portion thereof.

Figure 2A:
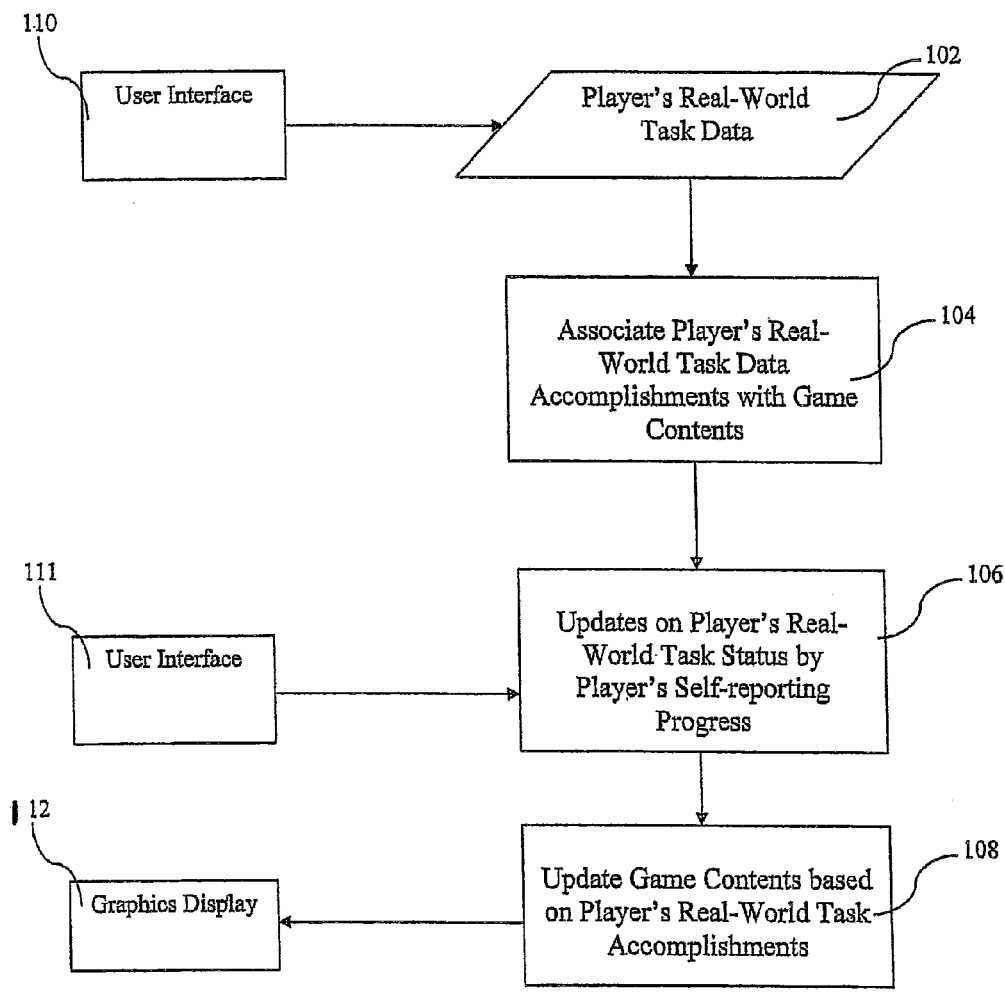
FIG. 2A shows a flowchart diagram of key steps of a game system according to one embodiment of the present invention.

With reference to FIG. 2A, the key steps of a virtual pet association system is shown. In one embodiment, the virtual pet association system can associate tasks with a virtual pet and enable the player to maintain a virtual pet by working and completing the associated tasks. The virtual pet association system takes, as input from a user interface 110, such as a graphical user interface, actual task data 102 from a user. The task data describes plans, tasks, or activities a user of the game contemplate completing. By associating the tasks with a virtual pet, the present invention can be incentive for the user to complete the tasks. For example, a player's task can be a school homework assignment or practice a hobby, such as tennis. The task data 102 is associated with game content 104. As a user performs actual tasks entered into the virtual pet association system, the user can report progress 106 using user interface 111. Game contents are updated at 108 and displayed using graphics display 112.

Figure 2B:
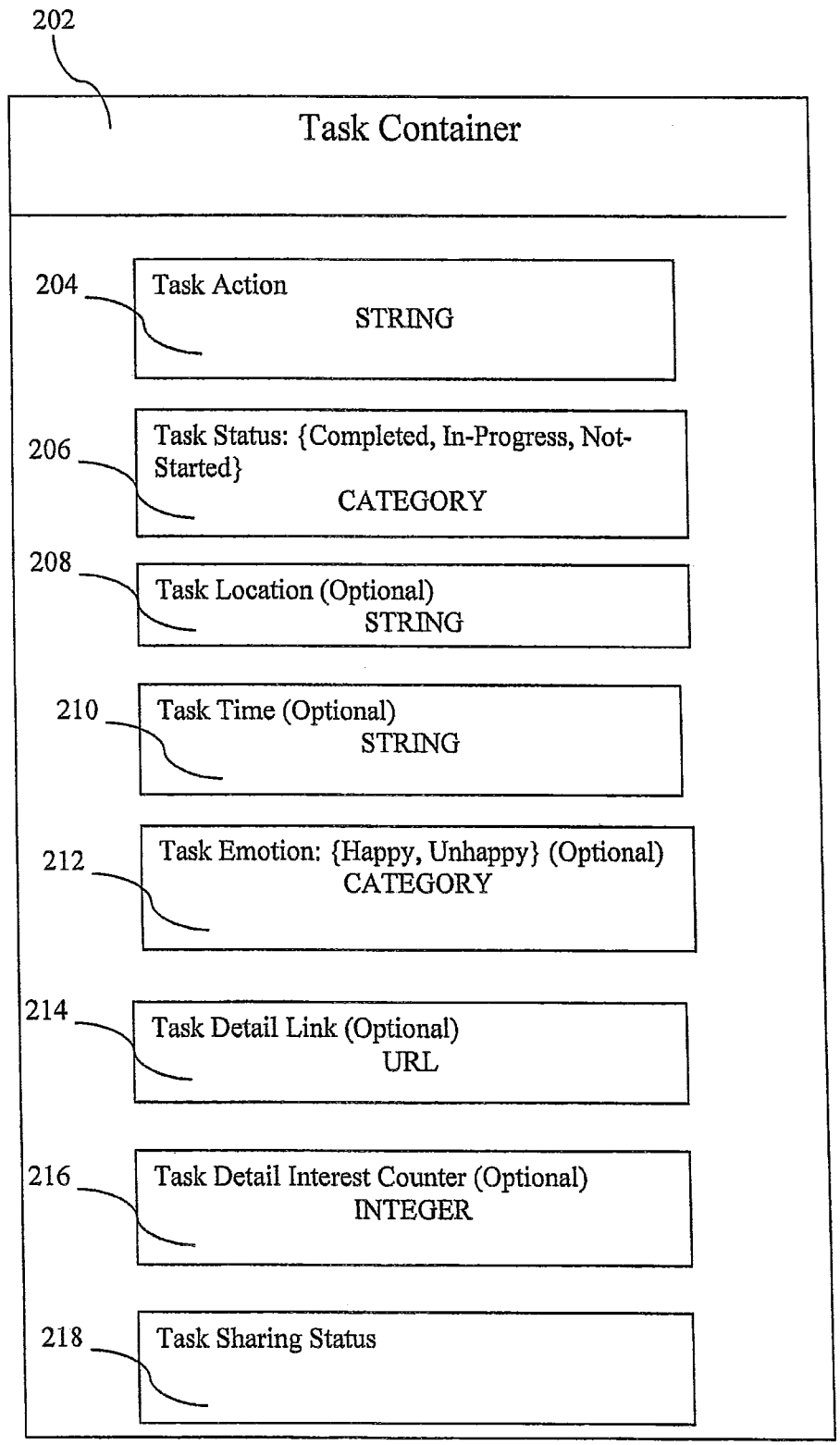
FIG. 2B is a diagram illustrating an exemplary data structure for storing actual task data according to one embodiment of the present invention.

With reference to FIG. 2B, task container 202 can be used for storing the task action 204 and information about the task. A task action 204 is a description of the unit of work that can be performed by a user and associated to a virtual pet. For example, write homework, brush teeth, clean bedroom, or play tennis is all possible task actions 204. Task container 202 stores task status 206 which can include a phrase to identify the status, for example, not-started, in-progress, and completed. Task status 206 describes the user's current progress of a particular task. Task container 202 also stores a task location 208. Task location 208 can be any phrase to identify location either generally or specific, for example, at home or 555 user St., Pittsburgh, Pa. A task container 202 further includes a task date 210, a phrase to identify when the task is due, for example, tomorrow, April 10th, or a time, such as 3:00 p.m. Task container 202 further includes task emotion 212 having phrases to identify an emotion, for example, happy or unhappy. Task container 202 further includes URL link 214 which stores a link to a web page describing task details. Task container 202 further includes a counter of interest 216, which records the number of people interested in detailed information of the task. Task container 202 further includes a sharing status 218 to indicate with whom a player wants to share task data and if a player needs help on the task. For example, sharing status 218 can include phrases to describe security, such as private, public, and need help.

In one embodiment of the present invention, a player has a task which is to write math homework at home at 6 p.m. For this exemplary task, a user interface is used to set the task container 202 to have a task action 204 of write math homework. The task status 206 can be not-started, indicating the task is new and has been inputted from a user interface. The task location 208 can be set to home, indicating this task is performed in the user's home. Task date 210 can be any time or date, for example, 6 p.m. Task emotion 212 can be set to happy, indicating happy as the player's emotion. The sharing status 218 is set to category public, therefore, this task is shared with other users.

Figure 3:
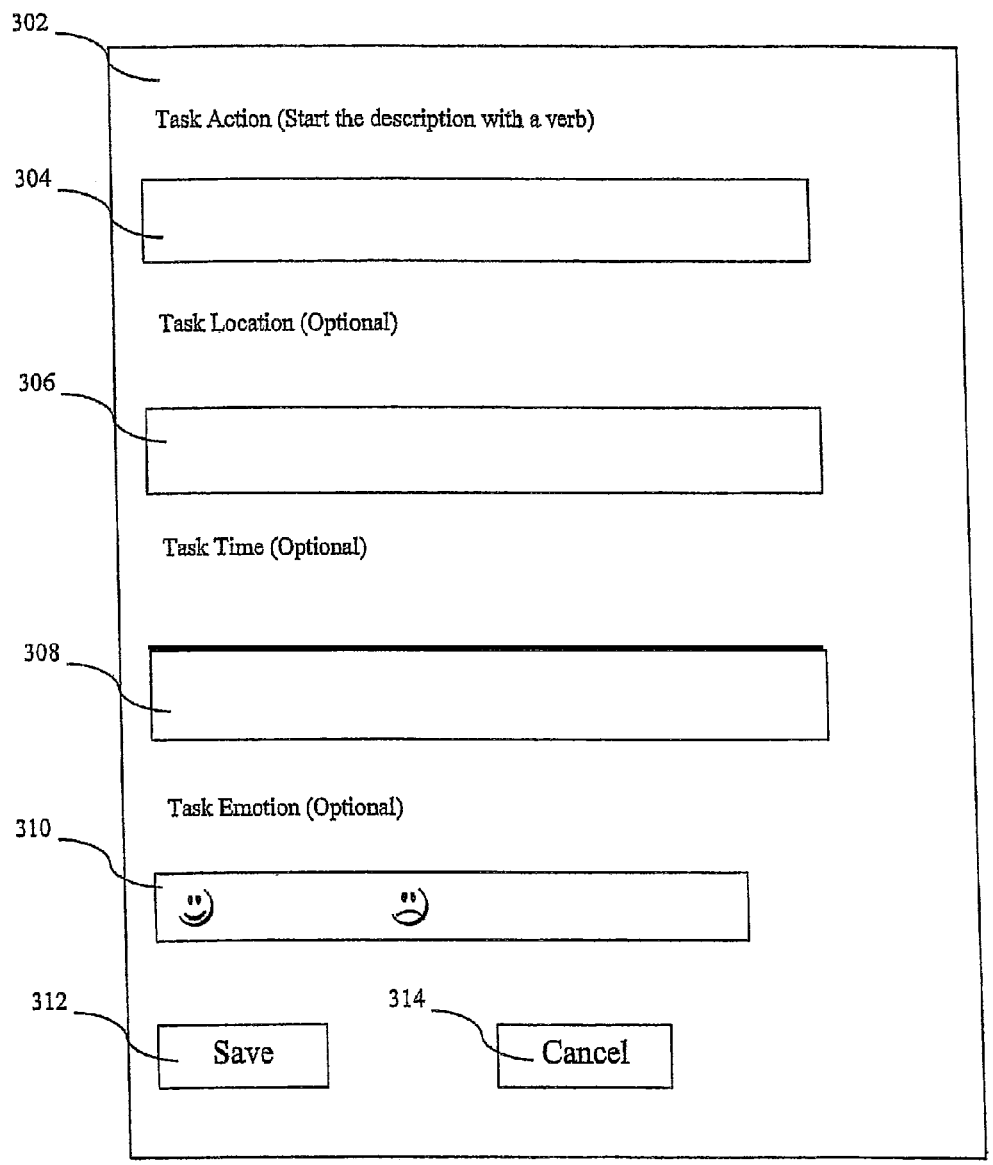
FIG. 3 is a diagram illustrating an exemplary user interface for collecting actual task data according to one embodiment of the present invention.

With reference to FIG. 3, a diagram illustrating an exemplary user interface 302 for collecting actual task data is shown, including task action 304, task location 306, task time 308, task emotions 310, save button 312, and a cancel button 314. The user interface 302 includes a field for allowing a player to input a task action 304, a field for allowing a player to input a task location 306, and a field for allowing a player to input a task 308. Buttons can be used to associate images representing a task emotion 310. The user interface 302 also includes a button 312 to save current contents and a cancel button 314 used to exit interface 302.

In an embodiment of the present invention, a player can own a virtual pet and the player takes care of the virtual pet through regular routine caring activities. These activities can include feeding, watering, cleaning, and playing with the pet. As with a regular pet, the status of a virtual pet will change. For example, to simulate hunger, the status of a virtual pet with regard to hunger may change as time passes since its last feeding. Each caring activity can change the status of a virtual pet. Using an interface 401, a player can control caring activities including pet diet 402, clean pet 404, feed pet 406, water pet 408, socialize pet 410. These caring activities can be triggered by a single user interface event or a series of USER interface events. For example, a user interface event can be a user mouse click on a button or a certain key stroke or a touch screen event on a single or multi-touch screen display device. For another example, a user can click or touch an image of pet food and drag it to the pet that displayed on the screen to feed the pet. However, one of ordinary skill in the art may use other events of the system to trigger caring activities.

A pet status 502 includes determining the current state of a virtual pet. Points or other indicia can be used to track status. For example, the pet can have a degree of hunger, thirst, cleanliness, or karma and a scaled point total for each stored in the system. For hunger, a pet can include hunger points. Pet hunger points 504 can show a degree of hunger of a virtual pet as an integer from 0 to 100, with 0 for very hungry and 100 standing for not hungry at all. Pet thirst points 506 describe a degree of thirst of a virtual pet from 0 to 100. Pet cleanliness points 508 describe a degree of cleanliness of a virtual pet from 0 to 100. Pet karma points 510 describe a degree of karma or specialization of a virtual pet from 0 for no karma at all to 100 standing for more karma. The points can be added together to calculate a total point status for the pet. Category and parameters of pet animation can be looked up using an animation index table or a decision tree from the current pet status to simulate pet behaviors in a variety of circumstances. For example, a rule in a decision tree can be that "if degree of hunger is lower than 30, then display pet hungry animation."

However, other scales can be used. In addition, the scale does not have to have a ceiling or floor, therefore, the point total could keep climbing. In the case of karma, this could indicate greater socialization.

The scaled points are controlled by processes, for example, when a clean pet 404 action is triggered, a clean pet 414 process can restore the pet cleanliness points to 100. When feed pet 406 action is triggered, a feed pet 416 process restores the pet hunger points to 100. Once the water pet 408 action is triggered, a pet thirst 418 process restores pet thirst points to 100. Once the social pet 410 action is triggered, a karma 420 process increases pet karma points for a certain number, for example 5. The purpose of this point system is to create a simulation of an actual pet. Just like a real pet, a virtual pet's status can degenerate over time. For example, a pet can become hungry, thirsty and dirty. An update pet status 424 changes the pet status once every fixed period as by timer 430. For example, in an embodiment of the present invention, every 30 minutes, values for pet hunger points, pet thirst points, and pet cleanliness points decrease by 5. Game content animation 426 is updated based on the pet status. For example, in one embodiment, when a pet is hungry, i.e., has low hunger points, game content animation 426 can be programmed to display the pet as actively seeking food. The virtual pet can be programmed to display as scratching or snarling.

Figure 5:
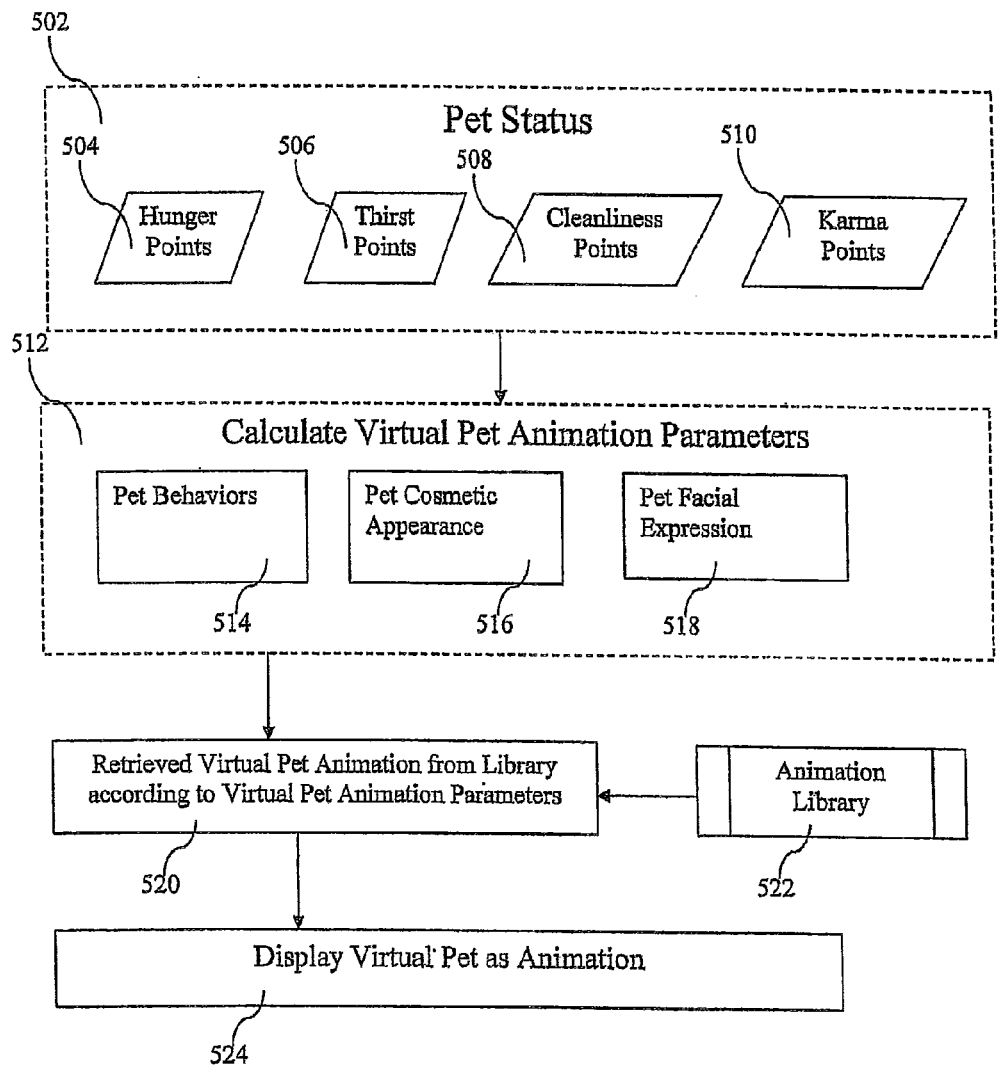
FIG. 5 is a diagram illustrating an exemplary process to display a virtual pet animation according to a pet status.

To program the virtual pet display based on pet status data 502, as seen in FIG. 5, a set of animation parameters 512 can be used, as shown in FIG. 5. Pet behavior 514, pet cosmetic appearance 516, and pet facial expression 518 are animation parameters and features of a pet which animate the variable pet status described above. For example, if pet hunger or pet thirst points are less than 50, pet behavior can be animated with a snarl. For a tired pet, if rest points are low, pet behavior can be animated to sleep or sit. When cleanliness points are low, pet cosmetic appearance is dirty, or when cleanliness points are high, pet cosmetic appearance is clean, such as after a bath activity. Virtual pet animation 520 is retrieved from an animation library 522, according to the animation parameters. Animation library 522 contains graphic animation files or models for eligible combinations of animation parameters. For example, a graphic animation could be stored as a sequence of image files. The type of image file is not meant to be a limitation, PNG, JPEG, GIF files are several examples. In a display virtual pet 524, the retrieved animation is displayed on a display. One skilled in the art of animation could recognize that other types of display could show a range of emotions for the virtual pet.

Figure 6:
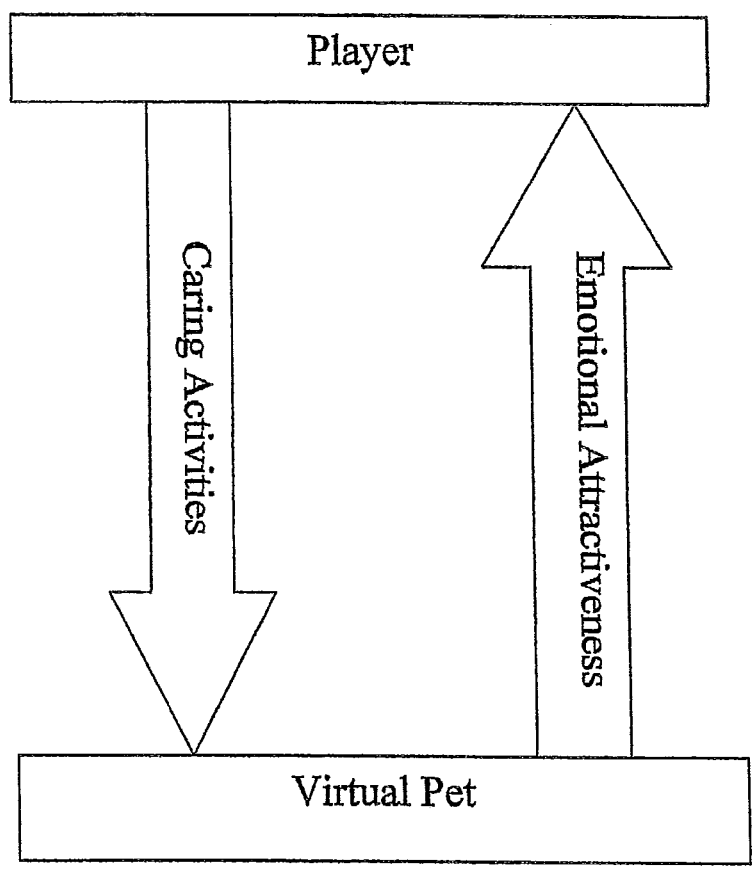
FIG. 6 is a diagram illustrating an underlying emotional process of a player when playing a virtual pet game.

The emotional effect of player activities when playing a virtual pet game is shown in FIG. 6. An emotional bond between a player and a virtual pet is built and strengthened as the player takes care of the virtual pet regularly and the pet becomes attractive as a result. The player becomes more emotionally attracted to take care of the pet as this emotional bond strengthens.

Figure 7:
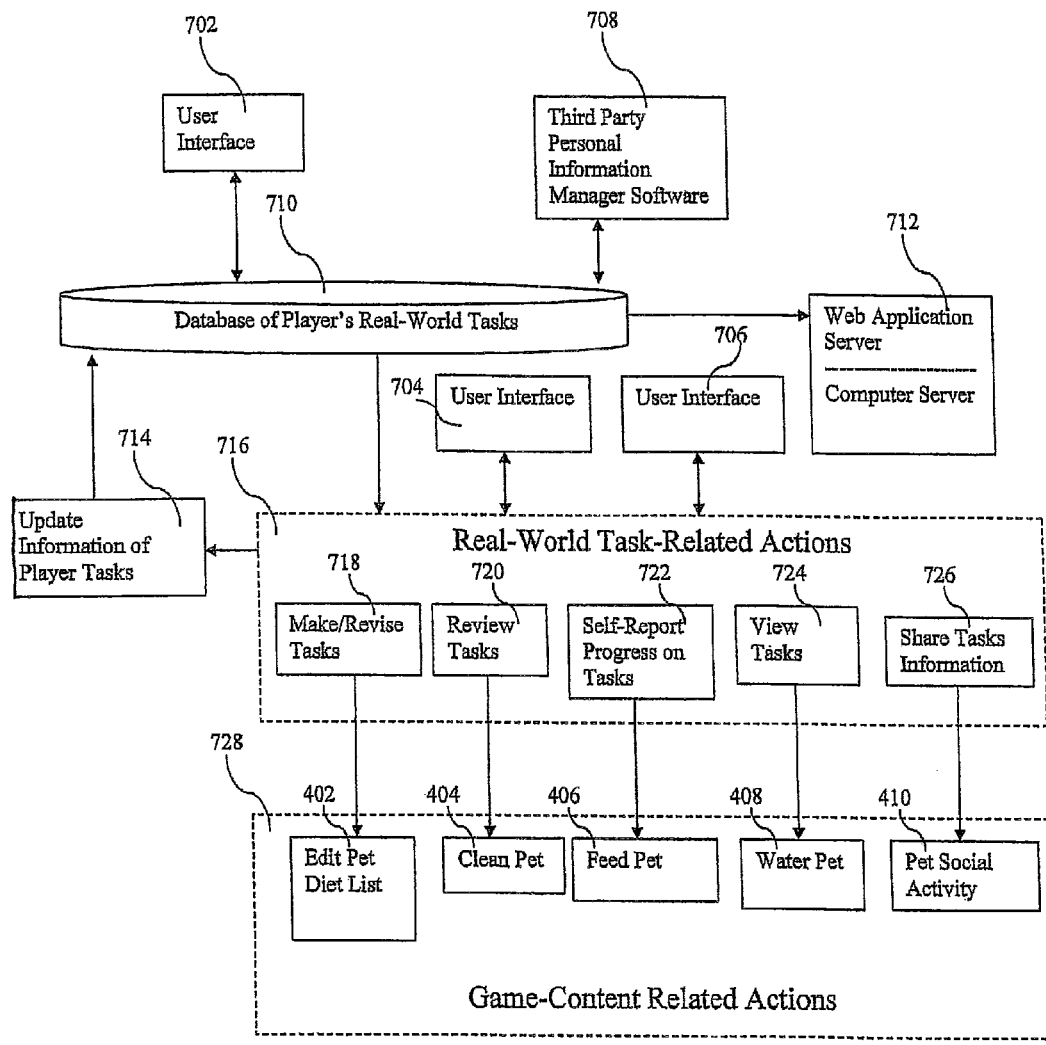
FIG. 7 is a diagram illustrating an exemplary process to connect a player's actual plans, tasks, and/or activities with contents in a virtual pet game.

The virtual pet system can be programmed to associate a player's tasks, something that need to be done, such as plans, work, or activities with contents in a virtual pet game using user interface 702, as shown. In FIG. 7, a database 710 can store information of a player's actual tasks collected from user interface 702. In one embodiment of the present invention, user interface 302 having input fields for capturing task information, as shown in FIG. 3, can be used. Tasks in the database 710 can also be imported from third-party personal information manager software which organizes personal information. Some examples of personal information manager software are Microsoft Outlook®, Gmail®, Windows Calendar®, or iCaeendar®. Those of skill in the art will recognize that numerous other software for the content source in the present invention are possible.

User interfaces 704 and 706 are programmed to activate a set of task related actions 716, which interacts with the database 710. The task related actions 716 can include actions for allowing a player to make/revise step 718, review tasks step 720, self-report progress step 722, view step 724, and share task information step 726.

Figure 8:
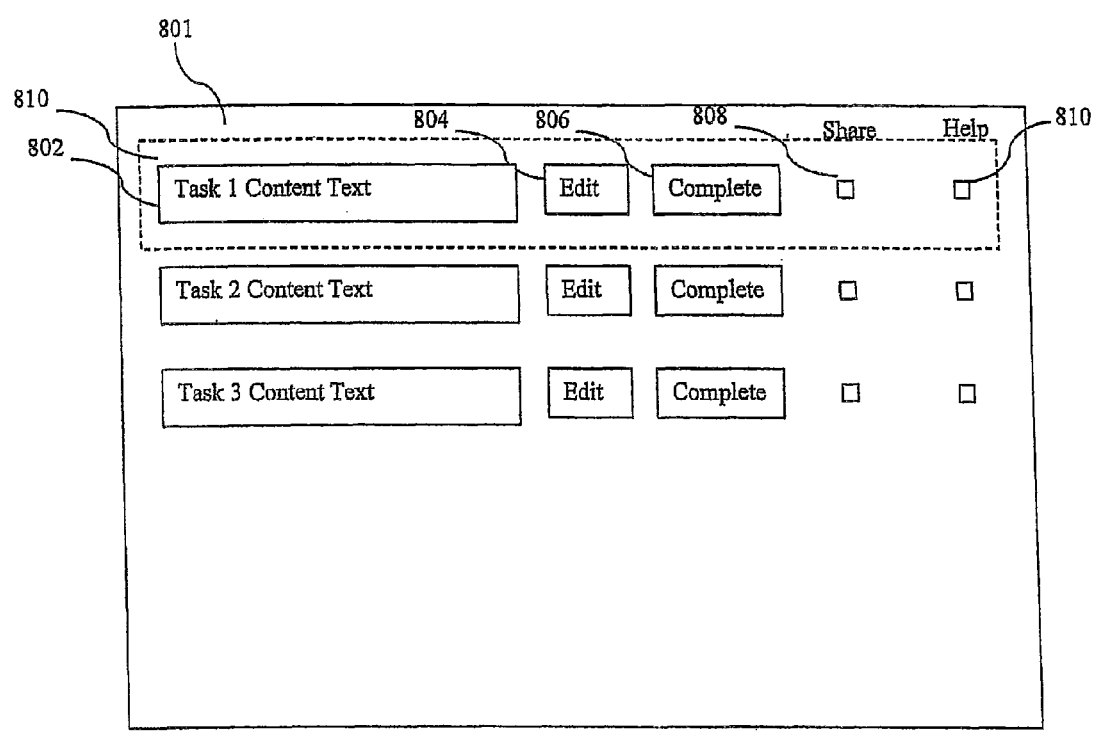
FIG. 8 is a general diagram illustrating an exemplary user interface for viewing tasks, self-reporting progress on tasks, and sharing tasks.

With reference to FIG. 8, a user interface 801 can include one or more task rows. Each row can be linked to a record in the database 710. A task row 810 can include a task action box 802. Edit task 804 is selected to edit task content using a user interface, such as the user interface 302. A complete button 806 can enable a player to complete the change to the task status, a share box 808. A help box 810 can enable a player to modify the sharing status 218. If share box 808 is selected and help checkbox 810 is not checked, the sharing status 218 is set to public. If both checkbox 808 and checkbox 810 are not selected, the sharing status 218 is set to private. If help checkbox 810 is checked, then the sharing status is set to need help.

Returning to FIG. 7, make/revise tasks step 718 can be activated when data is collected and saved from the user interface 702, as shown in FIG. 7. The steps 718-726 as shown in FIG. 7 can be activated using the user interface 801, shown in FIG. 8. View task step 724, for example, is activated when user interface 801 remains open for a period of time, the period duration being programmed into the system. A review tasks step 720 is activated when a user interface 801 remains open more than 5 minutes. Self-report progress on tasks step 722 is activated when a user selects complete button 806. Share tasks information step 726 is activated when share checkbox 808 is checked. An update step 714 sends task changes to database 710. These changes can include adding a new task, an existing task as marked completed, an existing task as marked share, or other common operations on tasks, specifically those found in a personal information manager software. Some examples of personal information manager software are Microsoft Outlook®, Gmail®, Windows Calendar®, or iCalendar®. Those of skill in the art will recognize that numerous other software for the content source in the present invention are possible. Web application server 712 can update contents of web pages based on the database 710. In one embodiment of the present invention, a player's blog on a computer server can automatically display task information of the player by retrieving and synchronizing user tasks with the task database 710.

Figure 4A:
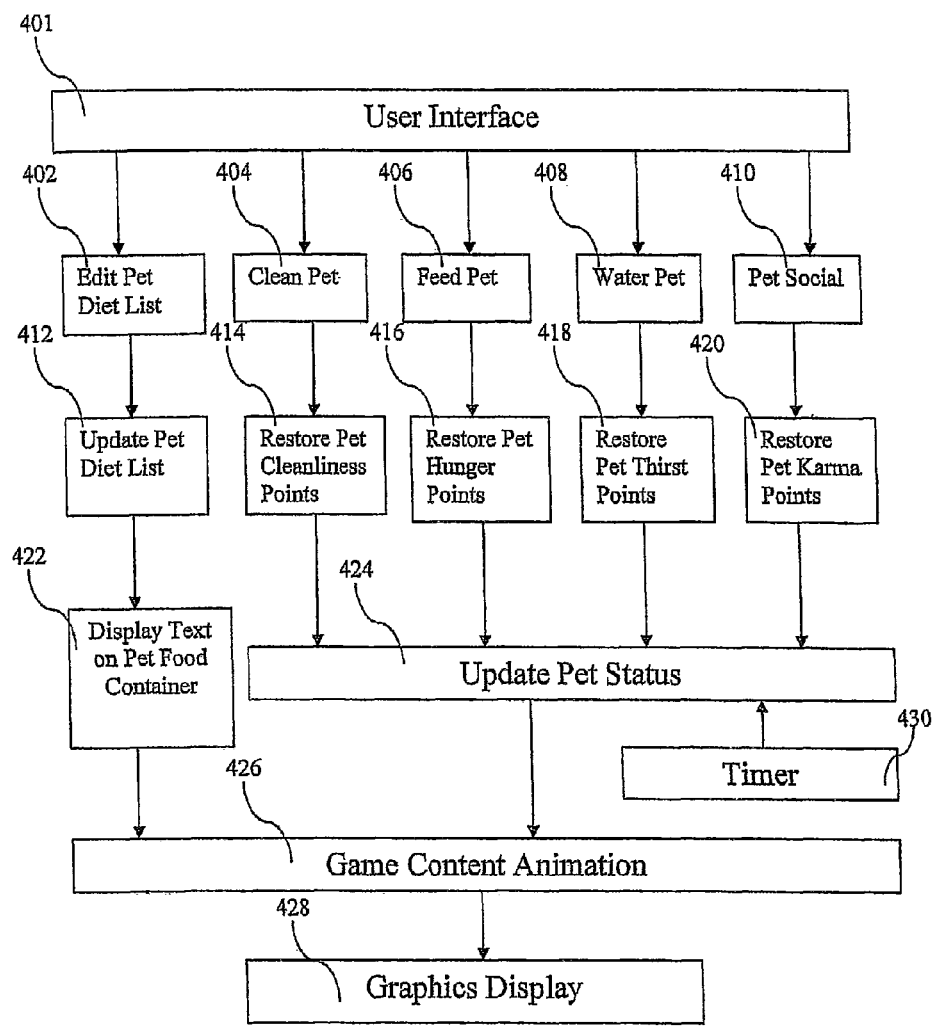
FIG. 4A is a flowchart diagram illustrating some exemplary key steps in a virtual pet game.
Figure 4B:
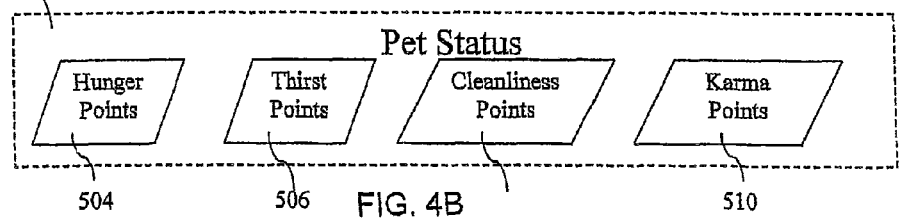
FIG. 4B is a flowchart diagram illustrating exemplary pet status structure.

The task-related actions of FIG. 7 are linked to corresponding game content-related action. Make/revise step 718 can activate programming to edit pet diet list 402, as shown in FIG. 4A when the make/revise step 718 is used to update contents in pet diet list 402. The pet diet list 402 is a list of task entries in a list form that are associated to feed the virtual pet. The task entries, as previously stated, include all functions a player has associated to a pet. These functions sustain the pet and keep it alive. Review tasks step 720 links to clean pet 404, therefore, when a player reviews their task list, the virtual response is to process the program code to clean the virtual pet. Self report progress on tasks step 722 links to feed pet action 406. When a player reports progress or identified tasks in the diet 402, the code is processed to feed the virtual pet. View tasks step 724 links to water pet 408, and the virtual pet receives drinks in response to player's view of the tasks. A share tasks information step 726 links to pet socialization process 410, and thereby increasing a pet's karma points. Each task related actions could trigger pet related awards or virtual money that allows the player to purchase pet related virtual products, such as pet food, from a virtual store in the system. One skilled in the art will recognize that other associations of player actions with virtual responses of the present invention are possible.

Figure 9:
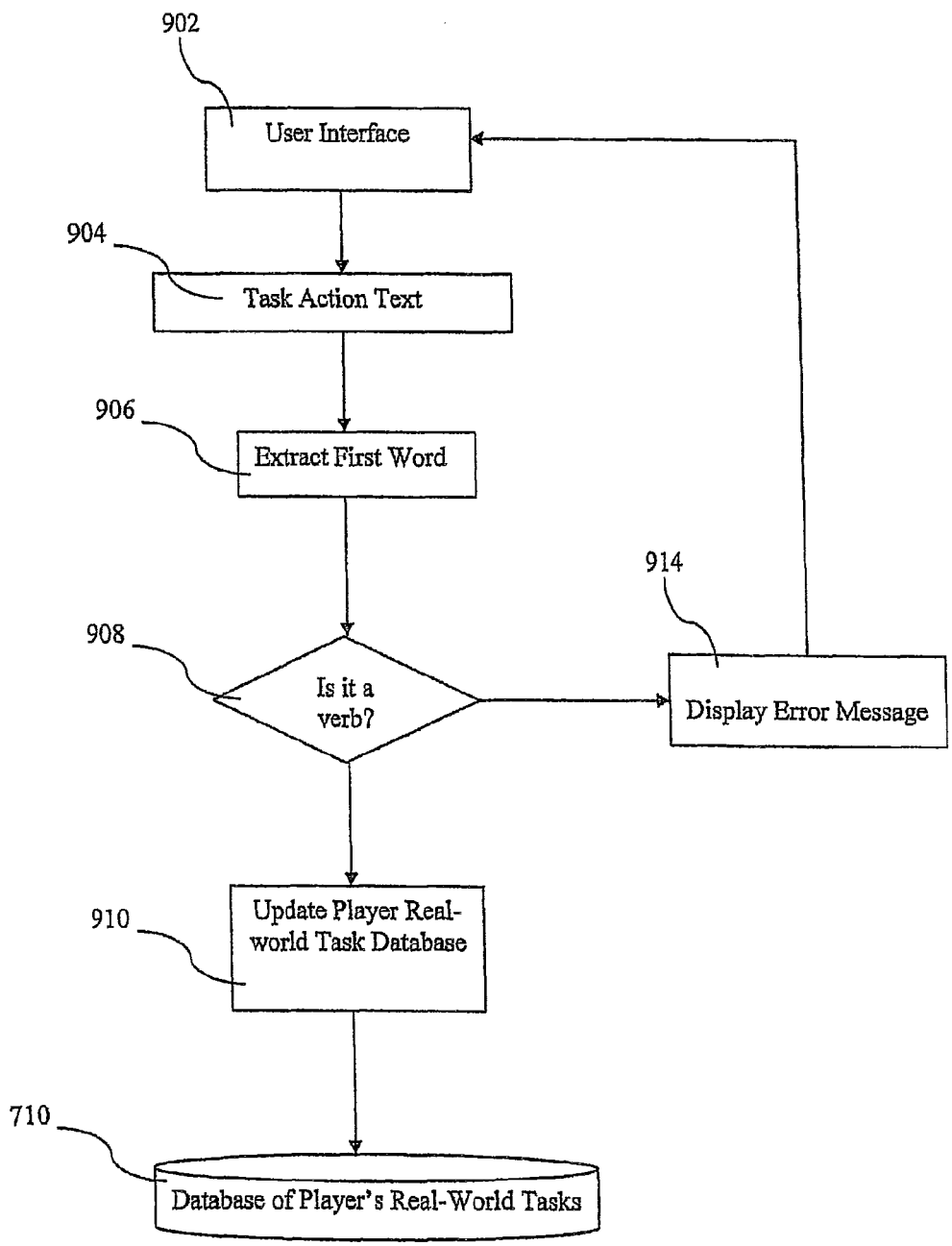
FIG. 9 is a flowchart diagram illustrating a process to ensure an input text starts with a verb.

With reference to FIG. 9, at block 902, a method of entering real-world tasks into a pet's diet list begins when a player completes a user field, such as tasks container 202 in the user interface 302. At block 904, after the save data is extracted, the first word in the data is extracted to be checked at block 906. At block 908, the word is compared to a verb list using a dictionary database. If the word is determined to be a verb at block 910, the input from the user interface is saved to the database 710. If the word is not a verb at block 914, an error message is displayed to the player. If there is an error, the player can modify the task action 304.

In an alternative embodiment, the task related actions can be linked to a virtual pet account. When the activities are completed, as described herein, rewards, such as prizes or virtual money, can be placed into the virtual pets account. This virtual money can then be used by the user to purchase items for the virtual pet of said user. The virtual money can be used to purchase virtual food, virtual drinks, virtual land, virtual clothes, virtual furniture, virtual jewelry, virtual accessories for the pet, toys, and additional virtual pets. Playing with the pet can include games where prizes and rewards are given.

Figure 10:
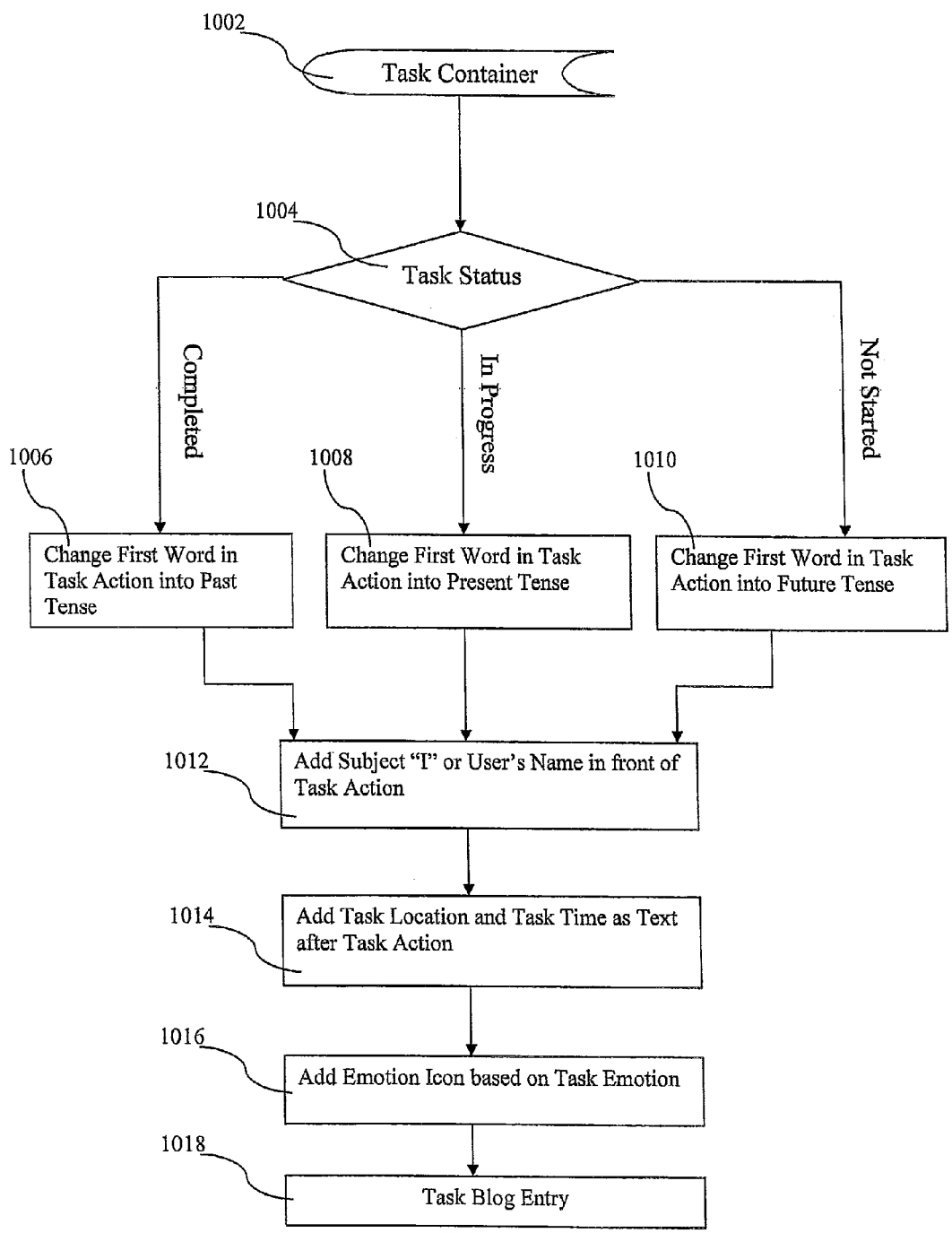
FIG. 10 is a flowchart diagram illustrating a process to create a blog entry from a task entry.

With reference to FIG. 10, a method of creating a blog entry begins at block 1002 when fields of task container 1002 are entered. At block 1004, the task status 1006 of the task container 1002 is checked. If the task status 1006 indicates the task is complete, the task action 1004 is changed by using a replace algorithm where the action is changed from present tense to past tense first, the first word is copied into a temporary storage field, then the first word is copied into a string, and first word of the task action 1004 is changed to past tense. If the task status 1006 indicates the task remains in progress, task action 1004 is changed to present tense by copying the task action 1004 and modifying. If the task status 1006 is not started, the task action 1004 is changed to future tense. At block 1012, the task action 1004 is further modified to indicate who did the task by adding user name, subject "I," or another subject representing the player to the string. Task location 10088 and task time 1010 are added at block 1014. They can be attached to the end of the string. An emotion icon is included, at block 1016, added to the end of the string. The task blog entry is complete at block 1018. The blog entry includes the name of the user, the action in proper tense, time, location, and emotion indicator.

Figure 11:
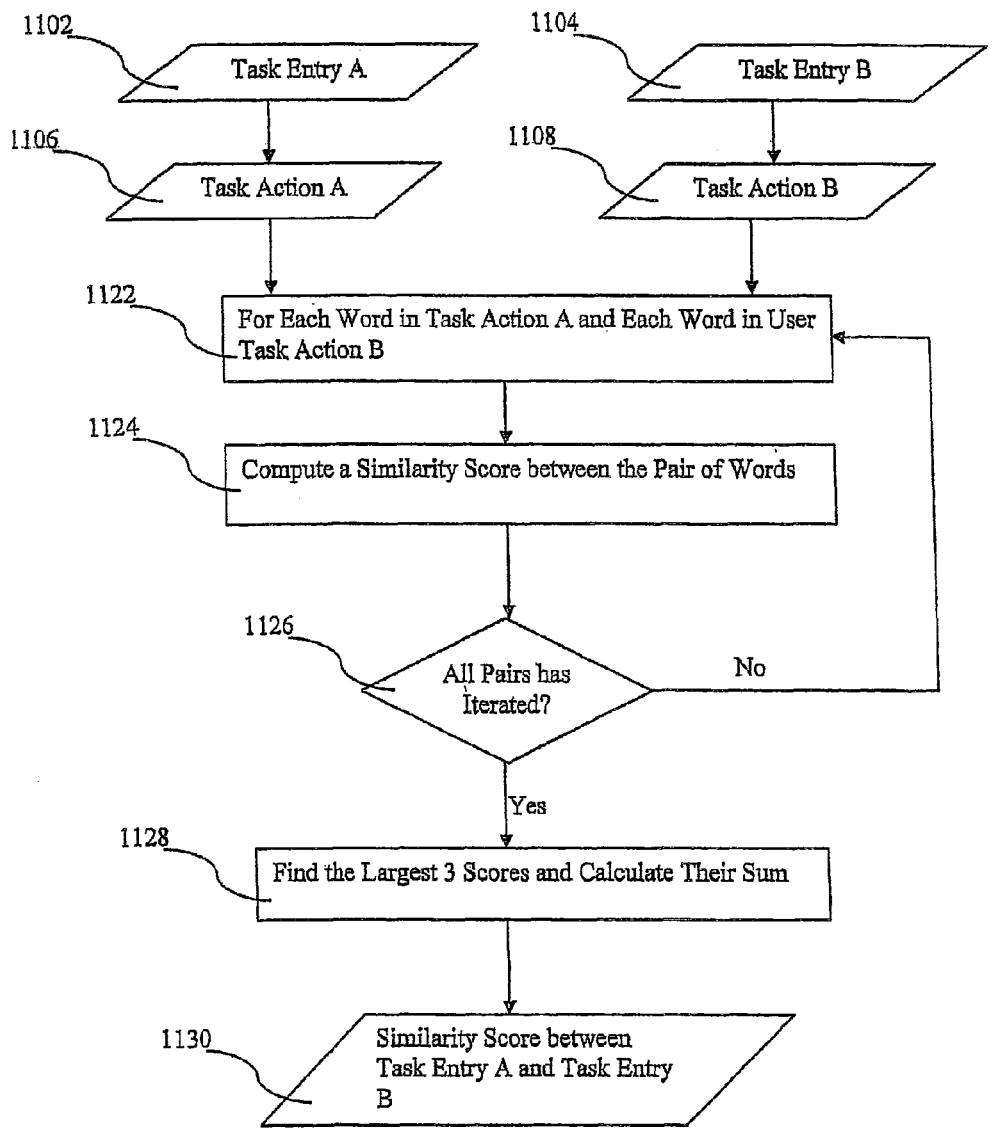
FIG. 11 is a flowchart illustrating a process to calculate a similarity score between two task entries.

With reference to FIG. 11, a method of calculating a similarity score between two task entries begins with selection of two task entries at blocks 1102 and 1104. Next, the two task actions of the selected entries are input at blocks 1106 and 1108. At block 1122, a program code iterates through each pair of words between the task actions of the selected entries in blocks 1106 and 1108. In each iteration at block 1124, a similarity score is computed between a pair of words using a standard semantic relatedness measurement. For relatedness measurement, the program can use WordNet® API, however, this is not limiting since one of skill in the art could recognize other programs or design an algorithm for this process. Next, program instructions determine if all iterations are finished at block 1126. At block 1128, the largest three similarity scores are found and they are used to calculate a sum. At block 1130, the similarity score between the task entries is complete and can be used in other modules of the system.

Figure 12:
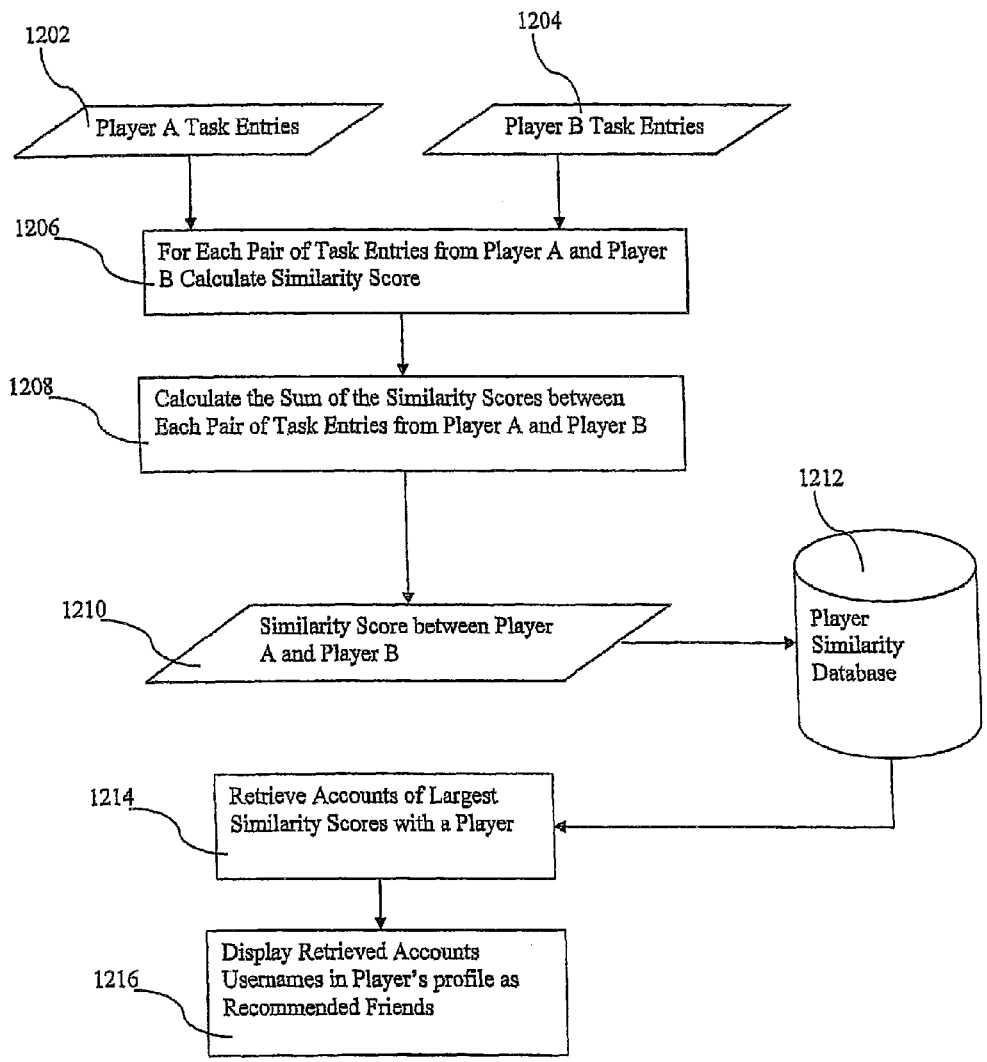
FIG. 12 is a flowchart illustrating a process to recommend other players to a player as friends based on similarity between their actual tasks.

With reference to FIG. 12, a similarity score is used in a method of recommendation beginning with task entries of two users at blocks 1202 and 1204 as input. At block 1206, the program calculates a similarity score between each pair of task entries of blocks 1202 and 1204, as shown in FIG. 11. The sum of the similarity scores can be calculated and stored as the sum as a similarity score between the two users. The resulting similarity score can be stored in a user similarity database at block 1212. In order to recommend a number (N) friends to a player, where (N) is a positive integer number, the program searches the database for players having the largest similarity score at block 1214. The program retrieves the selected players and displays account names of the (N) selected players in the player's profile web page at block 1216.

Figure 13:
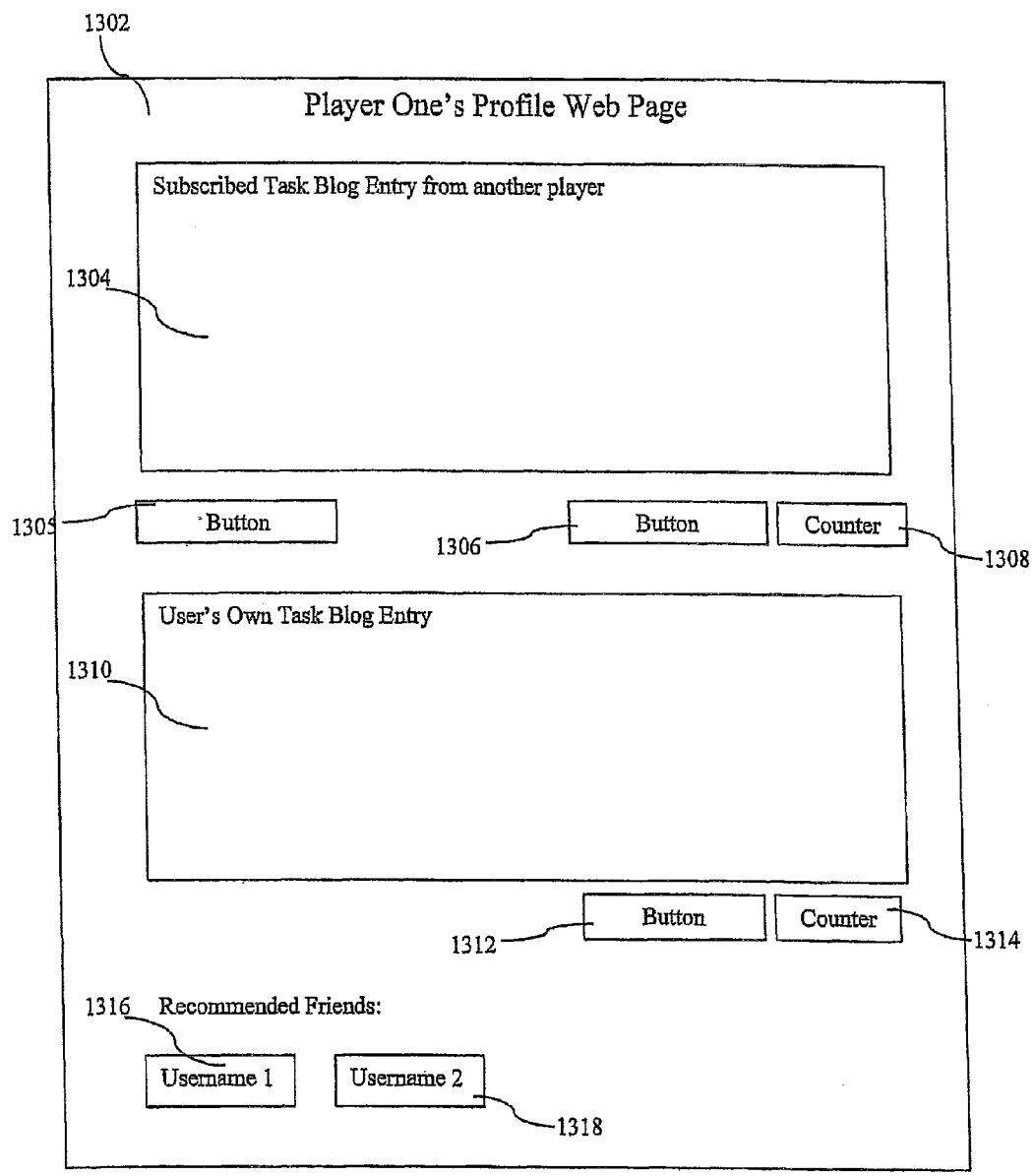
FIG. 13 is a general diagram illustrating a web user interface showing a player's profile.

With reference to FIG. 13, player profile interface 1302 can include a plurality of subscribed task blog entry window 1304, which can facilitate to share a task between a set of users. An entry window 1304 shows a task blog entry from another player. In one embodiment of the present invention, players can track the tasks of other players. They can track progress on the tasks and if they need help on any of them. Players can be informed about other actions, such as what their friends are doing, what their friends are going to do, and choose if they are going to help their friends on some of the tasks. One can use micro-blog software or blog software, such as Laconica, to host a micro-blog website and realize features like following or subscribing to friends' task blog entry updates. Button 1305 enables a player to help on others' tasks. This button only appears below those subscribed task blog entries if other players have marked the corresponding tasks sharing status as "need help".

Button 1305 can activate to add the corresponding task entry 1304 of other players to the task list of a current player as a reference task entry. A reference task entry is stored in the same way as a task entry mentioned previously. In addition, a data-tag is created to identify it as a reference task entry with a reference link to the corresponding task entry in the task list of the other player. A player cannot edit the content of a reference task entry, but a player can delete such an entry by clicking button 1305 again. A reference task entry has the same contents as the task entry being referenced. Once a reference task entry task is updated, all the task entries that reference the task are automatically updated by synchronizing the corresponding data entries in the database or by using a read-only reference link to directly read the task being referenced without keeping a local copy in the task list of the other player. If the task is marked completed by a player, all players who helped on the task get their virtual pet fed. A karma score of a player's virtual pet is tracked and accumulates points when a player helps other players finish their tasks. Button 1306 allows a player to show interest in a friend's task blog entry and requests detailed information regarding the task. Counters 1308 and 1314 can track/count how many people are interested in the corresponding task blog entry. Button 1312 allows a user to create and/or edit the details of a user's task and store a link to the detailed information in the. A blog software, such as WordPress®, provides interface to allow a user to create, edit, and post detailed information of a task to a web page.

From the description above, a number of advantages of the present invention become evident. Routine task planning, tracking, and sharing processes were often boring before this invention.

The present invention provides a system to allow players to make, revise, review, share, and keep track of plans in an enjoyable way. The present invention also provides a method to associate friends who share the same life contents. Players of the game can find friends through the system who have the most similar actual tasks.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A method of game play to facilitate managing tasks comprising:
   providing a virtual pet having at least one pet related activity;
   enabling a player to perform at least one task related action, wherein the at least one task related action comprises at least one of entering non-virtual pet related tasks;
   verifying the at least one non-virtual pet related task entered by the player;
   storing the at least one non-virtual pet related task in a database after the at least one non-virtual pet related task is verified, each non-virtual pet related task including at least one task action of the player, wherein the at least one task action describes the at least one non-virtual pet related task;
   determining a current status of the virtual pet;
   displaying the virtual pet based on the current status of the virtual pet;
   mapping the at least one task related action including the at least one non-virtual pet related task to the at least one pet related activity of the virtual pet, such that the performance of the at least one task related action by the player affects the current status of the virtual pet; and
   maintaining the virtual pet when the player performs the at least one task related actions to activate the at least one pet related activity to change the current status of the virtual pet.

2. The method of claim 1, wherein the current status of the virtual pet declines at a set period.

3. The method of claim 1, wherein linking further comprises associating the at least one task related action to the at least one pet related activity.

4. The method of claim 1, wherein the at least one pet related activity to maintain said virtual pet comprises at least one caring activity, which virtually sustains and keeps the virtual pet alive, the at least one caring activity comprising at least one of:
   feeding the pet, watering the pet, cleaning the pet, playing with the pet, or any combination thereof.

5. The method of claim 4, wherein the at least one caring activity comprises an activity simulating caring for a pet.

6. The method of claim 1, wherein the step of mapping the at least one task related action includes mapping a task related action indicating the completion of a non-virtual pet related task to rewarding the virtual pet.

7. The method of claim 6, wherein said rewarding comprises placing virtual money into an account for said virtual pet.

8. The method of claim 7, wherein said virtual money is used to buy virtual goods in a virtual world of said virtual pet and said goods comprise at least one of:
   virtual food, virtual clothing, virtual water, virtual drinks, virtual household goods, or any combination thereof.

9. The method of claim 1, wherein the at least one task action comprises at least one of: "write math homework," "play tennis," "practice piano," or any combination thereof.

10. The method of claim 1, wherein the at least one task related action further comprises at least one of: revising a non-virtual pet related task, reviewing non-virtual pet related tasks, self-report progress on non-virtual pet related tasks, modifying non-virtual pet related tasks, viewing non-virtual pet related tasks, sharing non-virtual pet related task information, share sharing non-virtual pet related task with friends, or any combination thereof.

11. The method of claim 10, wherein the step of mapping the at least one task related action includes mapping the self-report progress on non-virtual pet related tasks to feed the virtual pet, such that when the player self-reports progress on a non-virtual pet related task entered by the player, the virtual pet is maintained by restoring a status indicating hunger for the virtual pet.

12. The method of claim 1, wherein the virtual pet is displayed in a virtual world in a browser application.

13. The method of claim 1, wherein the virtual pet is integrated into a computer or mobile-device application using application interfaces to facilitate communication with the virtual pet.

14. The method of claim 1, wherein the tasks are plans, work, or activities that are planned to be done by the player, and are described by the player, the description by the player is stored in the database and comprises at least one of: a task status, a task location, a task date, a task emotion, a task detail, a sharing status, a URL, a counter of interest, or any combination thereof.

15. The method of claim 1, wherein the step of verifying the tasks is a semantic verification of the tasks, the steps comprising:
   receiving a non-virtual pet related task;
   extracting task action data from the non-virtual pet related task;
   determining if the received task action data begins with a verb by checking the first word in the task action data and comparing the word to a verb list using a dictionary database; and
   storing the non-virtual pet related task to the database, if the task action data begins with a verb.

16. The method of claim 1 further comprising creating a blog entry from a task, the steps comprising:
   retrieving a non-virtual pet related task including a task status and a task action from the database;
   checking a task status of the non-virtual pet related task;
   copying the task action into a storage field;
   changing the storage field, if the task status has changed, wherein the storage field is changed to past tense, if the task status indicates the task is complete, the storage field is changed to present tense, if the task status indicates the task remains in progress, and the storage field is changed to future tense, if the task status indicates the task is new; and
   modifying the storage field to indicate who did the non-virtual pet related task by adding a user name or a subject, representing the player.

17. The method of claim 1 further comprising calculating a similarity score between two tasks, the steps comprising:
   retrieving from the database a first non-virtual pet related task including a first task action and a second non-virtual pet related task including a second task action;
   iterating through each pair of words between the first task action and a second task action;
   computing a similarity score between the each pair of words using a standard semantic relatedness measurement; and
   calculating the similarity score between the two non-virtual pet related tasks based at least partially on a sum of largest of three similarity scores between the each pair of words.

18. A virtual pet association system, comprising:
   a server system providing a virtual pet game, the server system comprising a processor, an input device, memory coupled to the processor, and software stored in the memory, the software including programming instructions, that when executed by the processor, configures the processor to:
   provide a user interface configured to receive a real-world task in an application operating on an computer or a mobile device from a user, the real-world task including a description and a discrete task management activity;
   provide a virtual world having a virtual pet for display on the application operating on the computer or the mobile device, wherein the received real-world task is operative to change a status of the virtual pet virtually habitating in the virtual world, and the status is an indicator of separate state items comprising at least one of: hunger state of the virtual pet, thirst state of the virtual pet, cleanliness state of the virtual pet, karma state of the virtual pet, amount of virtual money of the virtual pet, or any combination thereof;
   allow the user to invoke the discrete task management activity, wherein the task management activity comprises at least one non-virtual pet related task;
   link the discrete task management activity including the at least one non-virtual pet related task to a state item, such that the user interaction invoking the discrete task management activity changes the state item; and
   animate the virtual pet based at least partially on status changes and determination by an animation library comprising animation parameters associated with the status of the virtual pet, the animation parameters configured to animate at least one of: pet behavior, cosmetic appearance, pet facial expression, or any combination thereof.

19. The virtual pet association system as in claim 18, wherein the description comprises at least one of: a task status, a task location, a task date, a task emotion, a task detail, a sharing status, a URL, a count of interest, or any combination thereof.

20. The virtual pet association system of claim 18, wherein the virtual pet game includes a diet list, and the diet list is configurable to include at least one real-world task.

21. The virtual pet association system of claim 20, wherein the virtual pet is fed by completing the at least one real-world task in said diet list, such that the completion of the at least one real-world task modifies the hunger state of the virtual pet.

22. The virtual pet association system of claim 20, wherein the discrete task management activity is a review of the real-world task, such that the performance of the review of the real-world task virtually cleans the virtual pet.

23. The virtual pet association system of claim 20, wherein the discrete task management activity is a view of the real-world task, such that the performance of the view of the real-world task virtually quenches thirst of the virtual pet.

24. The virtual pet association system of claim 18, wherein the separate state items are transformed into the status using an indicia representing each separate state item of the virtual pet, and the discrete task management activity is a progress report, such that performance of the progress report virtually feeds the virtual pet.

25. The virtual pet association system of claim 18, wherein the discrete task management activity is sharing the real-world task with another user, such that performance of the sharing increases the karma state of the virtual pet, the karma state indicating greater socialization.

* * * * *

UNITED STATES PATENT AND TRADEMARK OFFICE
CERTIFICATE OF CORRECTION

PATENT NO.         : 8,628,392 B1                                     Page 1 of 1
APPLICATION NO.    : 12/784177
DATED              : January 14, 2014
INVENTOR(S)        : Xiaohui Kong It is certified that error appears in the above-identified patent and that said Letters Patent is hereby corrected as shown below:

In the Claims

Column 13, Line 7, Claim 10, delete "share sharing" and insert -- sharing --

Signed and Sealed this
Seventeenth Day of June, 2014

Michelle K. Lee
*Deputy Director of the United States Patent and Trademark Office*